(12) United States Patent
Castleberry et al.

(10) Patent No.: US 8,924,598 B1
(45) Date of Patent: *Dec. 30, 2014

(54) USB INTERFACE CONFIGURABLE FOR HOST OR DEVICE MODE

(71) Applicant: Marvell International Ltd., Hamilton (BM)

(72) Inventors: Jim Castleberry, Boise, ID (US); David Luke, Boise, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/171,491

(22) Filed: Feb. 3, 2014

Related U.S. Application Data

(63) Continuation of application No. 12/434,000, filed on May 1, 2009, now Pat. No. 8,683,085.

(60) Provisional application No. 61/050,808, filed on May 6, 2008.

(51) Int. Cl.
  *G06F 3/00* (2006.01)
  *G06F 13/38* (2006.01)
(52) U.S. Cl.
  CPC .................................. *G06F 13/385* (2013.01)
  USPC ................................................. 710/8; 710/14
(58) Field of Classification Search
  None
  See application file for complete search history.

(56) References Cited

U.S. PATENT DOCUMENTS

| | | | |
|---|---|---|---|
| 4,611,299 A | 9/1986 | Hori et al. | |
| 4,823,340 A | 4/1989 | Grassman et al. | |
| 5,260,905 A | 11/1993 | Mori | |
| 5,307,343 A | 4/1994 | Bostica et al. | |
| 5,440,523 A | 8/1995 | Joffe | |
| 5,680,595 A | 10/1997 | Thomann et al. | |
| 5,701,517 A | 12/1997 | Carpenter | |
| 5,719,890 A | 2/1998 | Thomman et al. | |
| 5,778,007 A | 7/1998 | Thomann et al. | |
| 5,802,131 A | 9/1998 | Morzano | |
| 5,815,447 A | 9/1998 | Thomann | |
| 5,864,504 A | 1/1999 | Tanzawa et al. | |
| 5,875,470 A | 2/1999 | Dreibelbis et al. | |
| 5,953,340 A | 9/1999 | Scott et al. | |
| 5,996,051 A | 11/1999 | Mergard | |
| 6,000,006 A | 12/1999 | Bruce et al. | |
| 6,016,273 A | 1/2000 | Seki et al. | |
| 6,021,086 A | 2/2000 | Joffe et al. | |
| 6,034,957 A | 3/2000 | Haddock et al. | |

(Continued)

FOREIGN PATENT DOCUMENTS

| FR | 2779843 | 12/1999 |
|---|---|---|
| JP | 1162294 | 6/1989 |

(Continued)

OTHER PUBLICATIONS

"6-Port Fast Ethernet Switch, 88E6060 (Product Overview)", Link Street; www.marvell.com; Marvell Semiconductor, Inc.; Sunnyvale, CA, 2002, 2 pgs.

(Continued)

*Primary Examiner* — Zachary K Huson

(57) ABSTRACT

Various embodiments provide a USB interface that can operate in either a Host or Device mode using standard Link and/or physical interface circuit (PHY) components which, in at least some embodiments, do not have additional circuitry that is utilized to implement the USB OTG standard.

20 Claims, 6 Drawing Sheets

(56) References Cited

U.S. PATENT DOCUMENTS

| | | | |
|---|---|---|---|
| 6,067,301 A | 5/2000 | Aatresh |
| 6,081,528 A | 6/2000 | Thomann |
| 6,115,389 A | 9/2000 | Mahale et al. |
| 6,160,814 A | 12/2000 | Ren et al. |
| 6,167,491 A | 12/2000 | McAlpine |
| 6,216,205 B1 | 4/2001 | Chin et al. |
| 6,230,191 B1 | 5/2001 | Walker |
| 6,370,624 B1 | 4/2002 | Ajanovic et al. |
| 6,446,173 B1 | 9/2002 | Pham |
| 6,487,207 B1 | 11/2002 | Thomann |
| 6,535,939 B1 | 3/2003 | Arimilli et al. |
| 6,535,963 B1 | 3/2003 | Rivers |
| 6,539,467 B1 | 3/2003 | Anderson et al. |
| 6,539,488 B1 | 3/2003 | Tota et al. |
| 6,567,304 B1 | 5/2003 | Kleveland |
| 6,615,324 B1 | 9/2003 | Fernald |
| 6,618,390 B1 | 9/2003 | Erimli et al. |
| 6,712,704 B2 | 3/2004 | Elliott |
| 6,714,643 B1 | 3/2004 | Gargeya et al. |
| 6,717,847 B2 | 4/2004 | Chen |
| 6,732,184 B1 | 5/2004 | Merchant et al. |
| 6,735,773 B1 | 5/2004 | Trinh et al. |
| 6,741,589 B1 | 5/2004 | Sang et al. |
| 6,785,272 B1 | 8/2004 | Sugihara |
| 6,876,702 B1 | 4/2005 | Hui et al. |
| 6,886,120 B2 | 4/2005 | Yamazaki |
| 7,038,950 B1 | 5/2006 | Hamilton et al. |
| 7,039,781 B2 | 5/2006 | Iwata et al. |
| 7,068,651 B2 | 6/2006 | Schmidt et al. |
| 7,075,827 B2 | 7/2006 | Aoyama et al. |
| 7,076,631 B2 | 7/2006 | Herron |
| 7,099,325 B1 | 8/2006 | Kaniz et al. |
| 7,130,308 B2 | 10/2006 | Haddock et al. |
| 7,136,953 B1 | 11/2006 | Bisson et al. |
| 7,149,834 B2 | 12/2006 | Peters et al. |
| 7,185,132 B2 | 2/2007 | Tang |
| 7,197,591 B2 | 3/2007 | Kwa et al. |
| 7,249,270 B2 | 7/2007 | Mansell et al. |
| 7,274,611 B2 | 9/2007 | Roohparvar |
| 7,284,106 B1 | 10/2007 | Fernald |
| 7,313,019 B2 | 12/2007 | Giduturi et al. |
| 7,329,136 B2 | 2/2008 | Su et al. |
| 7,334,072 B1 | 2/2008 | Wright |
| 7,356,676 B2 | 4/2008 | Paver et al. |
| 7,359,997 B2 | 4/2008 | Ishida et al. |
| 7,411,830 B2 | 8/2008 | Takeuchi et al. |
| 7,447,824 B2 | 11/2008 | Jabori et al. |
| 7,451,280 B2 | 11/2008 | Furtek et al. |
| 7,463,528 B2 | 12/2008 | Mokhlesi et al. |
| 7,467,253 B2 | 12/2008 | Yero |
| 7,469,311 B1 | 12/2008 | Tsu et al. |
| 7,478,188 B2 | 1/2009 | Patton |
| 7,480,757 B2 | 1/2009 | Atherton et al. |
| 7,480,808 B2 | 1/2009 | Caruk et al. |
| 7,496,707 B2 | 2/2009 | Freking et al. |
| 7,499,343 B2 | 3/2009 | Kang |
| 7,536,490 B2 | 5/2009 | Mao |
| 7,539,809 B2 | 5/2009 | Juenger |
| 7,542,350 B2 | 6/2009 | Park et al. |
| 7,571,287 B2 | 8/2009 | Lee et al. |
| 7,583,600 B1 | 9/2009 | Schanke et al. |
| 7,599,221 B2 | 10/2009 | Yamada |
| 7,606,960 B2 | 10/2009 | Munguia |
| 7,613,045 B2 | 11/2009 | Murin et al. |
| 7,613,871 B2 | 11/2009 | Tanaka et al. |
| 7,624,221 B1 | 11/2009 | Case |
| 7,649,539 B2 | 1/2010 | Evans et al. |
| 7,660,925 B2 | 2/2010 | Larson et al. |
| 7,685,322 B2 | 3/2010 | Bhesania et al. |
| 7,689,753 B2 | 3/2010 | Kwak et al. |
| 7,734,874 B2 | 6/2010 | Zhang et al. |
| 7,752,342 B2 | 7/2010 | Tee et al. |
| 7,822,955 B2 | 10/2010 | Flynn et al. |
| 7,903,462 B1 | 3/2011 | Yeung et al. |
| 7,941,590 B2 | 5/2011 | Yang et al. |
| 7,945,825 B2 | 5/2011 | Cohen et al. |
| 7,949,817 B1 | 5/2011 | Sakarda |
| 8,127,104 B1 | 2/2012 | Shen |
| 8,131,915 B1 | 3/2012 | Yang |
| 8,154,919 B2 | 4/2012 | Lee et al. |
| 8,205,028 B1 | 6/2012 | Sakarda |
| 8,213,228 B1 | 7/2012 | Yang |
| 8,213,236 B1 | 7/2012 | Wu |
| 8,234,425 B1 | 7/2012 | Milner |
| 8,335,878 B2 | 12/2012 | Lee |
| 8,423,710 B1 | 4/2013 | Gole |
| 8,533,386 B1 | 9/2013 | Yang |
| 8,683,085 B1 | 3/2014 | Castleberry et al. |
| 8,688,877 B1 | 4/2014 | Lee et al. |
| 8,688,922 B1 | 4/2014 | Assmann |
| 2001/0003198 A1 | 6/2001 | Wu |
| 2001/0036116 A1 | 11/2001 | Kubo et al. |
| 2002/0116584 A1 | 8/2002 | Wilkerson |
| 2003/0154314 A1 | 8/2003 | Mason, Jr. et al. |
| 2004/0027901 A1 | 2/2004 | Shiga et al. |
| 2004/0093389 A1 | 5/2004 | Mohamed et al. |
| 2004/0098556 A1 | 5/2004 | Buxton et al. |
| 2004/0193774 A1 | 9/2004 | Iwata et al. |
| 2004/0199734 A1 | 10/2004 | Rajamani et al. |
| 2004/0202192 A9 | 10/2004 | Galbi et al. |
| 2005/0008011 A1 | 1/2005 | Georgiou et al. |
| 2005/0268001 A1 | 12/2005 | Kimelman et al. |
| 2006/0010304 A1 | 1/2006 | Homewood et al. |
| 2006/0031628 A1 | 2/2006 | Sharma |
| 2006/0075144 A1 | 4/2006 | Challener et al. |
| 2006/0106962 A1 | 5/2006 | Woodbridge et al. |
| 2006/0288153 A1 | 12/2006 | Tanaka et al. |
| 2006/0288188 A1 | 12/2006 | Ma et al. |
| 2007/0002880 A1 | 1/2007 | Chien et al. |
| 2007/0176939 A1 | 8/2007 | Sadowski |
| 2007/0229503 A1 | 10/2007 | Witzel et al. |
| 2007/0271609 A1 | 11/2007 | Chen et al. |
| 2007/0283086 A1 | 12/2007 | Bates |
| 2008/0094897 A1 | 4/2008 | Chung et al. |
| 2008/0126728 A1 | 5/2008 | Fernald |
| 2008/0147978 A1 | 6/2008 | Pesavento et al. |
| 2008/0148083 A1 | 6/2008 | Pesavento et al. |
| 2008/0175055 A1 | 7/2008 | Kim |
| 2008/0195801 A1 | 8/2008 | Cheon et al. |
| 2008/0215773 A1 | 9/2008 | Christison et al. |
| 2008/0215774 A1 | 9/2008 | Kim et al. |
| 2008/0256282 A1 | 10/2008 | Guo et al. |
| 2008/0265838 A1 | 10/2008 | Garg et al. |
| 2008/0270679 A1 | 10/2008 | Joo |
| 2008/0294951 A1 | 11/2008 | Ahmad et al. |
| 2008/0320189 A1 | 12/2008 | Arssov |
| 2009/0067511 A1 | 3/2009 | Wei et al. |
| 2009/0113166 A1 | 4/2009 | Houston et al. |
| 2009/0122610 A1 | 5/2009 | Danon et al. |
| 2009/0132770 A1 | 5/2009 | Lin |
| 2009/0150599 A1 | 6/2009 | Bennett |
| 2009/0154000 A1 | 6/2009 | Kojima |
| 2009/0200982 A1 | 8/2009 | Hurtz |
| 2009/0228739 A1 | 9/2009 | Cohen et al. |
| 2009/0273975 A1 | 11/2009 | Sarin et al. |
| 2009/0300260 A1 | 12/2009 | Woo et al. |
| 2010/0027350 A1 | 2/2010 | Melik-Martirosian et al. |
| 2014/0215164 A1 | 7/2014 | Lee et al. |

FOREIGN PATENT DOCUMENTS

| | | |
|---|---|---|
| JP | 4061094 | 2/1992 |
| JP | 5047174 | 2/1993 |
| JP | 10506776 | 6/1998 |
| JP | 2004288355 | 10/2004 |
| JP | 5107204 | 10/2012 |

OTHER PUBLICATIONS

"7-Port Fast Ethernet Switch with 802.1 Q, 88E6063 (Product Overview)", www.marvell.com; Marvell Semiconductor, Inc.; Sunnyvale, CA, 2002, 2 pgs.

"Advisory Action", U.S. Appl. No. 10/702,744, Sep. 11, 2007, 3 pages.

(56) References Cited

OTHER PUBLICATIONS

"Advisory Action", U.S. Appl. No. 12/163,801, Jan. 24, 2011, 2 pages.
"Coprocessor", Retrieved from <http://en.wikipedia.org/wiki/Coprocessor>, Nov. 2006, 1 page.
"Corrected Notice of Allowance", U.S. Appl. No. 13/268,183, Nov. 19, 2013, 2 pages.
"European Communication and Search Report", Application No. EP04006012; European Patent Office; Munich, Germany, May 30, 2005, 4 pgs.
"European Search Report", Application No. EP04006012; Munich, Germany, May 30, 2005, 4 pages.
"Final Office Action", U.S. Appl. No. 10/702,744, Jun. 25, 2007, 13 pages.
"Final Office Action", U.S. Appl. No. 12/163,801, Oct. 14, 2010, 12 pages.
"Final Office Action", U.S. Appl. No. 12/163,801, Nov. 14, 2011, 12 pages.
"Final Office Action", U.S. Appl. No. 12/182,014, Oct. 29, 2010, 16 pages.
"Final Office Action", U.S. Appl. No. 12/276,084, Oct. 17, 2011, 15 pages.
"Final Office Action", U.S. Appl. No. 12/332,870, Sep. 10, 2013, 20 pages.
"Final Office Action", U.S. Appl. No. 12/332,870, Oct. 12, 2011, 17 pages.
"Final Office Action", U.S. Appl. No. 12/434,000, Apr. 26, 2011, 15 pages.
"Final Office Action", U.S. Appl. No. 12/434,000, Sep. 4, 2012, 17 pages.
"Final Office Action", U.S. Appl. No. 12/494,076, Mar. 30, 2011, 13 pages.
"Final Office Action", U.S. Appl. No. 12/494,076, Oct. 3, 2011, 13 pages.
"Final Office Action", U.S. Appl. No. 13/092,734, Dec. 29, 2011, 6 pages.
"Foreign Notice of Allowance", JP Application No. 2008-270813, Aug. 31, 2012, 7 pages.
"Foreign Office Action", JP Application No. 2004-071574, Feb. 19, 2008, 4 pages.
"Foreign Office Action", JP Application No. 2008-270813, Apr. 3, 2012, 6 pages.
"Foreign Office Action", JP Application No. 2008-270813, May 26, 2011, 4 pages.
"Information Technology—Telecommunications and Information Exchange Between Systems—Local and Metropolitan Area Networks—Specific Requirements", IEEE, Wireless LAN Medium Access Control (MAC) and Physical Layer (PHY) Specifications, Aug. 20, 1999, 531 pages.
"Link Street 88E6063 7-Port Fast Ethernet Switch with QoS, 802.1Q VLAN, and Virtual Cable Tester (VCT) Technology", Marvell: News; www.marvell.com; Marvell Semiconductor, Inc.; Sunnyvale, CA, Jul. 14, 2003, 1 page.
"Link Street 88E6181 8-Port Gigabit Ethernet Switch with Four-Level QoS", Marvell: News; www.marvell.com; Marvell Semiconductor, Inc.; Sunnyvale, CA, Jul. 14, 2003, 1 page.
"Link Street, Integrated Gateway Router with Multi-Port QoS Switch 88E6218 (Product Overview)", Gateway Solutions; www.marvell.com; Marvell Semiconductor, Inc.; Sunnyvale, CA, 2003, 2 pgs.
"Link Street, Integrated Gateway Router with Multi-Port Switch, 88E6208 (Product Overview)", Gateway Solutions; www.marvell.com; Marvell Semiconductor, Inc.; Sunnyvale, CA, 2003, 2 pgs.
"Marvell Link Street Gigabit Ethernet Switches Enable the Rapid Deployment of Gigabit Connectivity for the SOHO Market", Marvell: Press and Investor News; Marvell Semiconductor, Inc.; Sunnyvale, CA; http://www.marvell.com/press/pressNewsDisplay.do?releaseID=347, Apr. 29, 2003, 2 pgs.
"Method and Circuit for Transferring Data with Dynamic Parity Generation and Checking Scheme in Multi-port DRAM", esp@cenet; Publication No. JP10506776T (Abstract of Corresponding Document No. US5778007); esp@cenet Database—Worldwide; http://v3.espacenet.com/textdoc?DB=EPODOC&IDX=JP10506776T&F=0, Jun. 30, 1998, 5 pages.
"Multiport Component Memory Series and Application with a Computer", Automated Translation; Europaisches Patentamt, European Patent Office, Office Europeen Des Brevets; Description of FR2779843; World Lingo Language Translation Services; www.worldlingo.com, Nov. 19, 2007, 15 pgs.
"Network Attached Storage (NAS) Advantages", Retrieved from: <http://www.html.co.uk/86/network-attached-storage-nas-advantages.htm l> on Oct. 7, 2013, Aug. 22, 2008, 4 pages.
"Non-Final Office Action", U.S. Appl. No. 12/182,014, Jun. 1, 2010, 13 pages.
"Non-Final Office Action", U.S. Appl. No. 10/702,744, Feb. 19, 2009, 5 pages.
"Non-Final Office Action", U.S. Appl. No. 10/702,744, Dec. 27, 2006, 10 pages.
"Non-Final Office Action", U.S. Appl. No. 12/163,801, Apr. 22, 2010, 10 pages.
"Non-Final Office Action", U.S. Appl. No. 12/163,801, Jul. 20, 2011, 11 pages.
"Non-Final Office Action", U.S. Appl. No. 12/180,238, Apr. 12, 2011, 7 pages.
"Non-Final Office Action", U.S. Appl. No. 12/276,084, Mar. 29, 2013, 7 pages.
"Non-Final Office Action", U.S. Appl. No. 12/276,084, Apr. 11, 2011, 12 pages.
"Non-Final Office Action", U.S. Appl. No. 12/332,870, Apr. 25, 2011, 15 pages.
"Non-Final Office Action", U.S. Appl. No. 12/332,870, May 8, 2013, 19 pages.
"Non-Final Office Action", U.S. Appl. No. 12/396,250, Jun. 23, 2011, 6 pages.
"Non-Final Office Action", U.S. Appl. No. 12/434,000, Mar. 14, 2013, 18 pages.
"Non-Final Office Action", U.S. Appl. No. 12/434,000, Nov. 10, 2010, 9 pages.
"Non-Final Office Action", U.S. Appl. No. 12/434,000, May 4, 2012, 15 pages.
"Non-Final Office Action", U.S. Appl. No. 12/436,577, Sep. 29, 2010, 6 pages.
"Non-Final Office Action", U.S. Appl. No. 12/494,076, Dec. 22, 2010, 12 pages.
"Non-Final Office Action", U.S. Appl. No. 12/726,310, Aug. 1, 2012, 11 pages.
"Non-Final Office Action", U.S. Appl. No. 12/862,600, Oct. 16, 2013, 8 pages.
"Non-Final Office Action", U.S. Appl. No. 13/045,186, Aug. 22, 2013, 12 pages.
"Non-Final Office Action", U.S. Appl. No. 13/092,734, Aug. 24, 2011, 15 pages.
"Non-Final Office Action", U.S. Appl. No. 13/177,965, Jul. 2, 2013, 7 pages.
"Non-Final Office Action", U.S. Appl. No. 13/268,183, May 7, 2013, 6 pages.
"Non-Final Office Action", U.S. Appl. No. 13/406,756, Nov. 5, 2012, 4 pages.
"Non-Final Office Action", U.S. Appl. No. 13/538,827, Feb. 22, 2013, 7 pages.
"Non-Final Office Action", U.S. Appl. No. 13/538,827, May 2, 2013, 6 pages.
"Non-Final Office Action", U.S. Appl. No. 13/860,394, Oct. 2, 2013, 13 pages.
"Non-Final Office Action", U.S. Appl. No. 14/230,555, Jun. 19, 2014, 11 pages.
"Notice of Allowance", U.S. Appl. No. 13/716,481, Nov. 14, 2013, 13 pages.
"Notice of Allowance", U.S. Appl. No. 10/702,744, Mar. 27, 2009, 7 pages.
"Notice of Allowance", U.S. Appl. No. 12/163,801, Mar. 22, 2012, 6 pages.
"Notice of Allowance", U.S. Appl. No. 12/180,238, Oct. 25, 2011, 6 pages.

(56) References Cited

OTHER PUBLICATIONS

"Notice of Allowance", U.S. Appl. No. 12/182,014, Jan. 20, 2011, 6 pages.
"Notice of Allowance", U.S. Appl. No. 12/276,084, Oct. 29, 2013, 5 pages.
"Notice of Allowance", U.S. Appl. No. 12/396,250, Nov. 16, 2011, 4 pages.
"Notice of Allowance", U.S. Appl. No. 12/434,000, Oct. 17, 2013, 9 pages.
"Notice of Allowance", U.S. Appl. No. 12/436,577, Apr. 14, 2011, 4 pages.
"Notice of Allowance", U.S. Appl. No. 12/494,076, Aug. 2, 2012, 8 pages.
"Notice of Allowance", U.S. Appl. No. 12/610,106, Feb. 29, 2012, 11 pages.
"Notice of Allowance", U.S. Appl. No. 12/726,310, Dec. 18, 2012, 6 pages.
"Notice of Allowance", U.S. Appl. No. 12/762,150, Mar. 19, 2012, 6 pages.
"Notice of Allowance", U.S. Appl. No. 13/045,186, Nov. 1, 2013, 9 pages.
"Notice of Allowance", U.S. Appl. No. 13/092,734, Feb. 23, 2012, 4 pages.
"Notice of Allowance", U.S. Appl. No. 13/177,965, Nov. 20, 2013, 5 pages.
"Notice of Allowance", U.S. Appl. No. 13/268,183, Jul. 29, 2013, 5 pages.
"Notice of Allowance", U.S. Appl. No. 13/406,756, May 8, 2013, 7 pages.
"Notice of Allowance", U.S. Appl. No. 13/538,827, Sep. 17, 2013, 7 pages.
"Partial European Search Report", Application No. EP04006012; European Patent Office, Munich, Germany, Mar. 14, 2005, 2 pgs.
"Restriction Requirement", U.S. Appl. No. 10/702,744, Jun. 30, 2006, 5 pages.
"Restriction Requirement", U.S. Appl. No. 12/610,106, Dec. 7, 2011, 5 pages.
"Restriction Requirement", U.S. Appl. No. 12/862,600, May 24, 2013, 7 pages.
"Restriction Requirement", U.S. Appl. No. 13/045,186, Jun. 19, 2013, 5 pages.
"U.S. Appl. No. 12/726,310", filed Mar. 17, 2010, 36 pages.
"U.S. Appl. No. 12/862,600", filed Aug. 24, 2010, 36 pages.
Litaize, et al., "Serial Multi Port Memory Component Comprising RAM Memory Bank Assemblies for Use in Computer", Abstract of FR2779843; Publication No. FR2779843; esp@cenet database; http://v3.espace.com/textdoc?DB=EPODOC&IDX=FR2779843&F=0, Dec. 12, 1999, 1 page.
Mori, "Multiport Memory", English Abstract of Japanese Patent Publication No. JP5047174; esp@cenet database—Worldwide, Feb. 26, 1993, 1 page.
Pallampati, "iSCSI Performance Over RDMA-Enabled Network", Thesis, Department of Electrical and Computer Engineering, Graduate School of Wichita State University, Jul. 2006, 58 pages.
Prince, "High Performance Memories, New Architectures DRAMs and SRAMs—Evolution and Function", John Wiley & Sons, Ltd.; West Sussex, England, 1996, pp. 58-61.

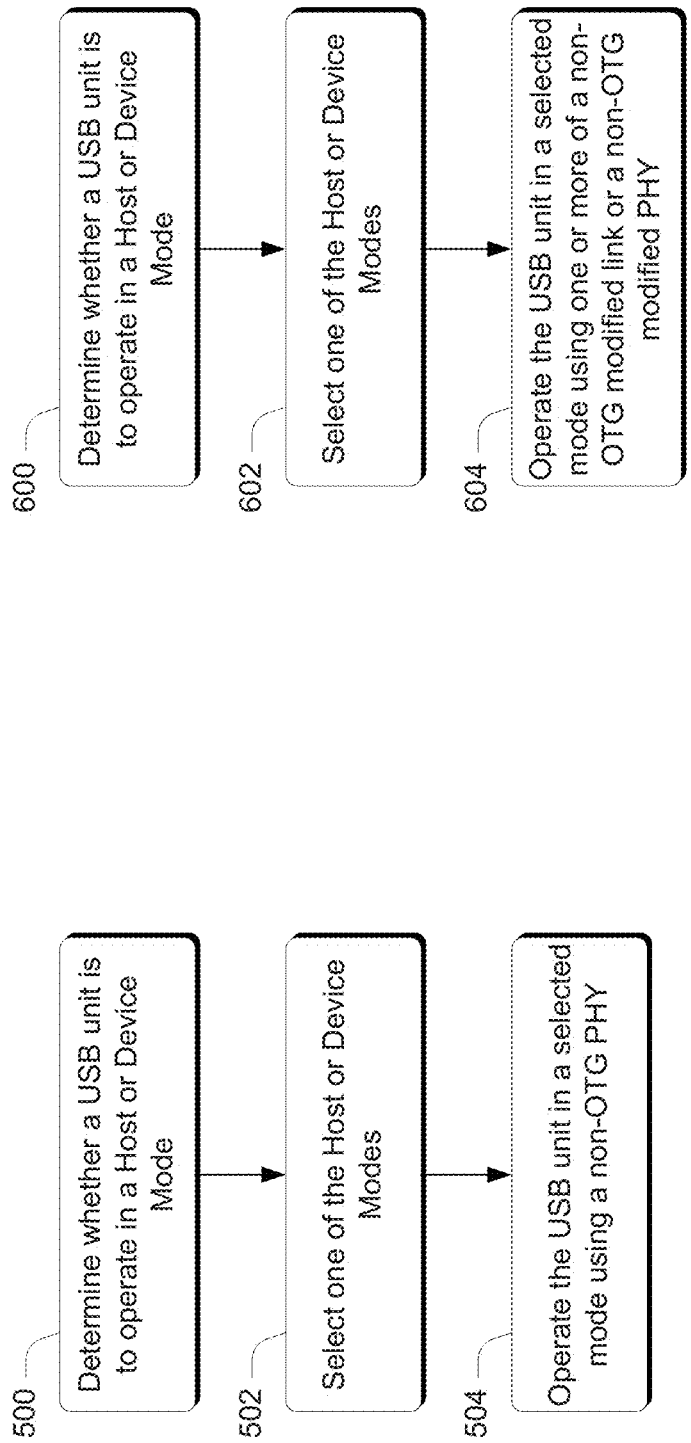

USB INTERFACE CONFIGURABLE FOR HOST OR DEVICE MODE

RELATED APPLICATION

This application is a continuation of and claims priority to U.S. Utility application Ser. No. 12/434,000, filed on May 1, 2009, which in turn claims priority to U.S. Provisional Application No. 61/050,808, filed on May 6, 2008, the disclosures of which are incorporated by reference herein in their entirety.

BACKGROUND

The Universal Serial Bus (USB) is an industry standard interface that defines a method of connecting two units (usually a computer and a peripheral device) together and communicating between them. The USB interface on each unit contains a USB link controller (Link) and a USB physical interface circuit (PHY). To communicate, one of the units operates as a USB Host which initiates communication requests between the units, and the other operates as a USB Device which responds to those requests.

When the USB standard was developed, it was assumed that the Host and Device functions were separate and permanent, meaning that a Host unit could never function as a Device unit and vice versa.

In recent years, the USB standard was enhanced to add the possibility of a unit that can function in either Host or Device mode. That capability is known as USB On The Go or OTG. For OTG, additional circuitry is added to the Link and the PHY, an additional signal or signals are added between the PHYs, and a new protocol is defined by which the two units can automatically determine which one of them will operate in Host mode and which will operate in Device mode. This approach utilizes a different PHY, a different connector, and a different cable than that utilized by the standard USB technology.

Another approach to providing a unit with both Device and Host capability would be to provide multiple ports, including separate Host and Device ports. This approach has a disadvantage in that it requires multiple connectors, multiple ASIC pins and the like.

Needless to say, these approaches add overhead and increase the cost associated with devices that are implemented with both Host and Device functionality.

SUMMARY

This Summary is provided to introduce subject matter that is further described below in the Detailed Description and Drawings. Accordingly, the Summary should not be considered to describe essential features nor used to limit the scope of the claimed subject matter.

In one embodiment, a USB unit comprises a mode selection module configured to determine whether the USB unit is to operate in a Host mode or a Device mode and select one of the Host mode or the Device mode; and a non-OTG USB physical interface circuit (PHY) associated with the mode selection module and configured to enable operation in a selected Host mode or Device mode.

In another embodiment, a USB unit comprises a USB OTG Link controller configured to operate in a Host mode or a Device mode; and a non-OTG USB physical interface circuit (PHY) operably connected to the USB OTG Link controller.

In another embodiment, a method comprises determining whether a USB unit is to operate in a Host or Device mode; selecting one of the Host or Device modes; and operating the USB in a selected mode using a non-OTG physical interface circuit (PHY).

In another embodiment, a system comprises means for determining whether a USB unit is to operate in a Host or Device mode; means for selecting one of the Host or Device modes; and means for operating the USB in a selected mode using a non-OTG physical interface circuit (PHY).

BRIEF DESCRIPTION OF THE DRAWINGS

In the figures, the left-most digit of a reference number identifies the figure in which the reference number first appears. The use of the same reference numbers in different instances in the description and the figures indicate like elements.

FIG. 5 is a flow diagram that describes a method in accordance with one or more embodiments.

FIG. 6 is a flow diagram that describes a method in accordance with one or more embodiments.

DETAILED DESCRIPTION

Various embodiments provide a USB interface that can operate in either a Host or Device mode using standard Link and/or physical interface circuit (PHY) components which, in at least some embodiments, do not have additional circuitry that is conventionally utilized to implement the USB OTG standard.

In the discussion that follows, a section entitled "Operating Environment" is provided and describes one example operating environment in which one or more embodiments can be employed. Following this, a section entitled "Multiplexed Link Controllers" describes one example embodiment in which a Host Link and a Device Link can be multiplexed into a standard USB PHY to provide OTG functionality. Next, a section entitled "OTG Link with Standard PHY" describes an embodiment in which an OTG Link is utilized in connection with a standard USB PHY to operate in a desired mode. Following this, a section entitled "Software/Hardware Hybrid Interface" describes an embodiment in which at least some of the Link controller and/or at least some of the PHY are implemented in software such that parts of the interface that are different between the Host mode and Device mode are implemented in software and can thus be changed as desired to switch between modes. Next, a section entitled "Example Methods" describes example methods in accordance with one or more embodiments. Last, a section entitled "Example USB Units" describes some example USB units that can employ the techniques described below.

Operating Environment

Figure 1:
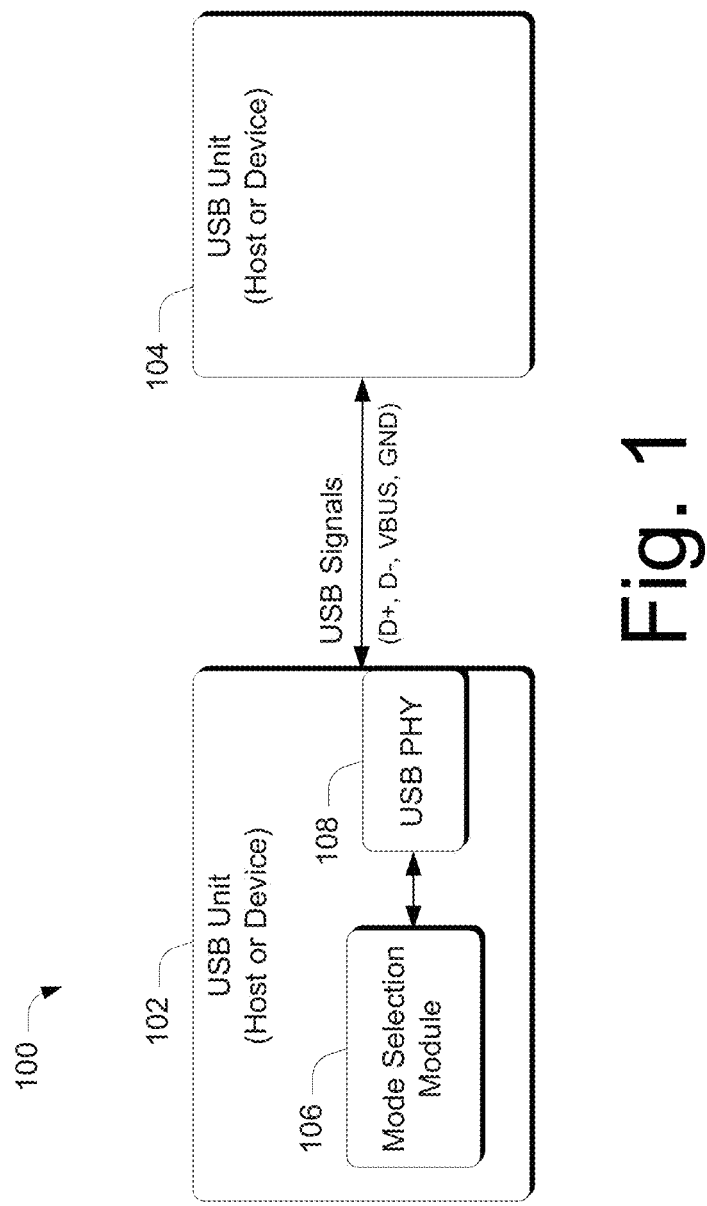
FIG. 1 is a block diagram of an example operating environment in accordance with one or more embodiments.

FIG. 1 illustrates an example operating environment in accordance with one or more embodiments generally at 100. In this example, operating environment 100 includes two USB units 102, 104. The USB units 102, 104 can communicate using USB signals that are conventionally used for USB communication. The USB units 102, 104 can comprise any suitable type of USB device including, by way of example and not limitation, desktop computing devices, mobile computing devices, mobile consumer electronic products such as personal digital assistants (PDAs), mobile phones, digital cameras, portable storage devices, printers and the like. Examples of USB units are shown and described in FIGS. 7-10 below.

In the illustrated and described embodiments, the USB units 102, 104 can utilize a USB interface to exchange data. In at least some embodiments, each of the USB units 102, 104 is configured or configurable as a USB Host or a USB Device. Accordingly, each of the USB units 102, 104 can, in at least some embodiments, operate in either a Host mode or a Device mode using standard Link and/or PHY components which do not have the additional circuitry that is utilized to implement the USB OTG standard. Yet, by virtue of the configuration of the USB units, each can implement both Host and Device functionality as will become apparent below. Accordingly, each USB unit 102, 104 can include a mode selection module 106 and a USB PHY 108, such as those shown for USB unit 102. In the illustrated example, mode selection module 106 is configured to determine and select a particular mode, such as Host mode or Device mode, and then interact with USB PHY 108 to effect operation of the USB unit 102 in the selected mode. In at least some embodiments, USB PHY 108 is a non-OTG PHY meaning that it is not compliant with the USB OTG standard. The mode selection module 106 can be implemented in connection with any suitable hardware, software, firmware or combination thereof, examples of which are provided below.

Having described an example operating environment, consider now a discussion of various embodiments that can provide Host and Device functionality. At least some of the embodiments described below can utilize a single USB port with a standard PHY that can enable a USB unit to operate in either the Host mode or the Device mode.

Multiplexed Link Controllers

Figure 2:
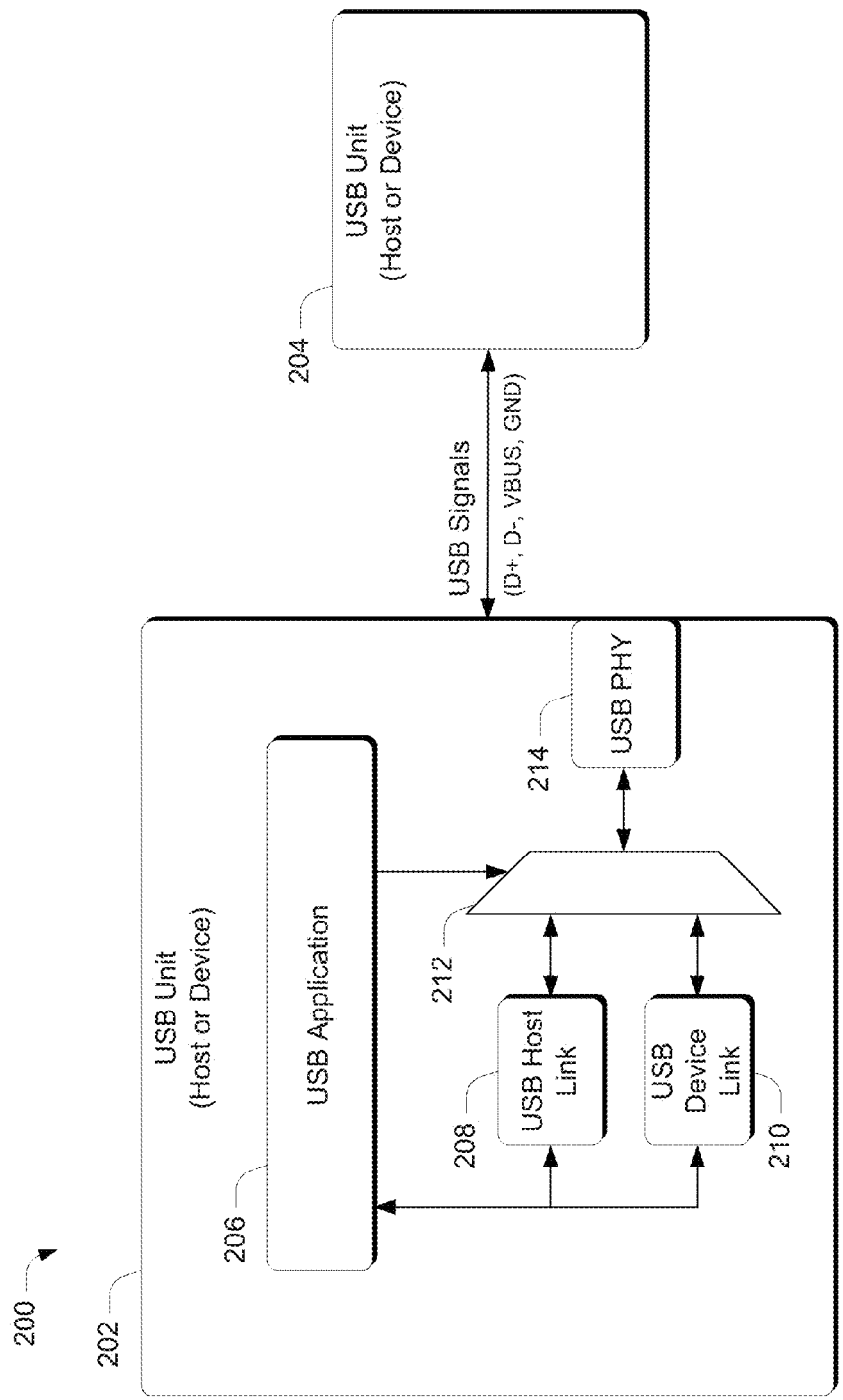
FIG. 2 illustrates an example system in accordance with one or more embodiments.

FIG. 2 illustrates an example system in accordance with one or more embodiments generally at 200. In this example, system 200 includes a USB unit 202 and a USB unit 204. Each of the USB units 202, 204 can be configured as described in relation to USB unit 202.

In the illustrated and described embodiment, USB unit 202 includes a USB application 206, a USB Host Link 208, a USB Device Link 210, a switch 212 and a USB PHY 214. In this example, a mode selection module can include one or more of the USB application 206, the USB Host Link 208, the USB Device Link 210, or the switch 212. Switch 212 can be embodied as any suitable type of switch. In at least some embodiments, switch 212 is implemented as a multiplexer. USB application 206 is operably connected or connectable to USB Host and Device Links 208, 210 respectively, as well as to switch 212. USB Host Link 208 and USB Device Link 210 are operably connected or connectable to switch 212. Switch 212 is operably connected or connectable to USB PHY 214 as shown.

In this example, USB Host Link 208 and USB Device Link 210 constitute separate link controllers that are non-OTG link controllers. Specifically, by being non-OTG link controllers, the link controllers are not specifically configured with OTG functionality. Further, the USB PHY 214 is a standard, non-OTG USB PHY that is not specifically configured with OTG functionality. In this example, switch 212 is configured by USB application 206 to selectively connect either USB Host Link 208 or USB Device Link 210 to USB PHY 214 depending on the desired mode of operation. For example, if USB unit 202 is to operate in the Host mode, USB application 206 selects the USB Host Link 208 via switch 212. Alternately, if USB unit 202 is to operate in the Device mode, USB application 206 selects the USB Device Link 210 via switch 212. By selecting a particular Link, the switch 212 enables a communication link with USB PHY 214 so that the USB unit 202 can operate in the selected mode.

In at least some embodiments, the USB Host link 208, USB Device Link 210, switch 212 and USB PHY 214 can be implemented by an integrated circuitry chip that is able to be pre-configured into a particular mode, e.g., Host mode or Device mode. This permits flexibility in the design of the integrated circuitry chip by enabling either mode to be selected at some point after manufacture of the integrated circuitry chip.

In at least some other embodiments, USB unit 202 can be configured to switchably alternate, in a dynamic fashion, between the Host mode and the Device mode. Such might be the case, for example, when one of the devices is a portable device, such as a PDA or hand-held device, whose role may change. In these embodiments, USB unit 204 may be compliant with OTG technology if some other unit within USB unit 202, other than USB Host Link 208, USB Device Link 210, and USB PHY 214, provides the additional functionality required for OTG compliance. Such other unit can include the USB application. To accomplish switching in a dynamic fashion, a signal can be provided by a component, such as USB application 206, to switch 212 to enable switch 212 to select a particular mode. In this embodiment, both the USB Host Link 208 and USB Device Link 210 can be standard hardware components. The switch 212 enables mode switching at times other than manufacture time such as, by way of example and not limitation, at power up or more frequently during operation.

To accomplish switching in the manner described above, the component or USB application 206 is knowledgeable of OTG-related protocols and can act on OTG-related communications to effect a mode switch. Examples of OTG-related protocols include Host Negotiation Protocol (HNP) and Session Request Protocol (SRP). HNP describes a way for two USB units to communicate with one another to decide which unit is going to act as a Host and which unit is going to act as a Device. SRP deals with a negotiation protocol in which, in some examples, devices can conserve battery power by shutting off their buses and ascertaining when to wake up and communicate with other devices.

OTG Link with Standard PHY

Figure 3:
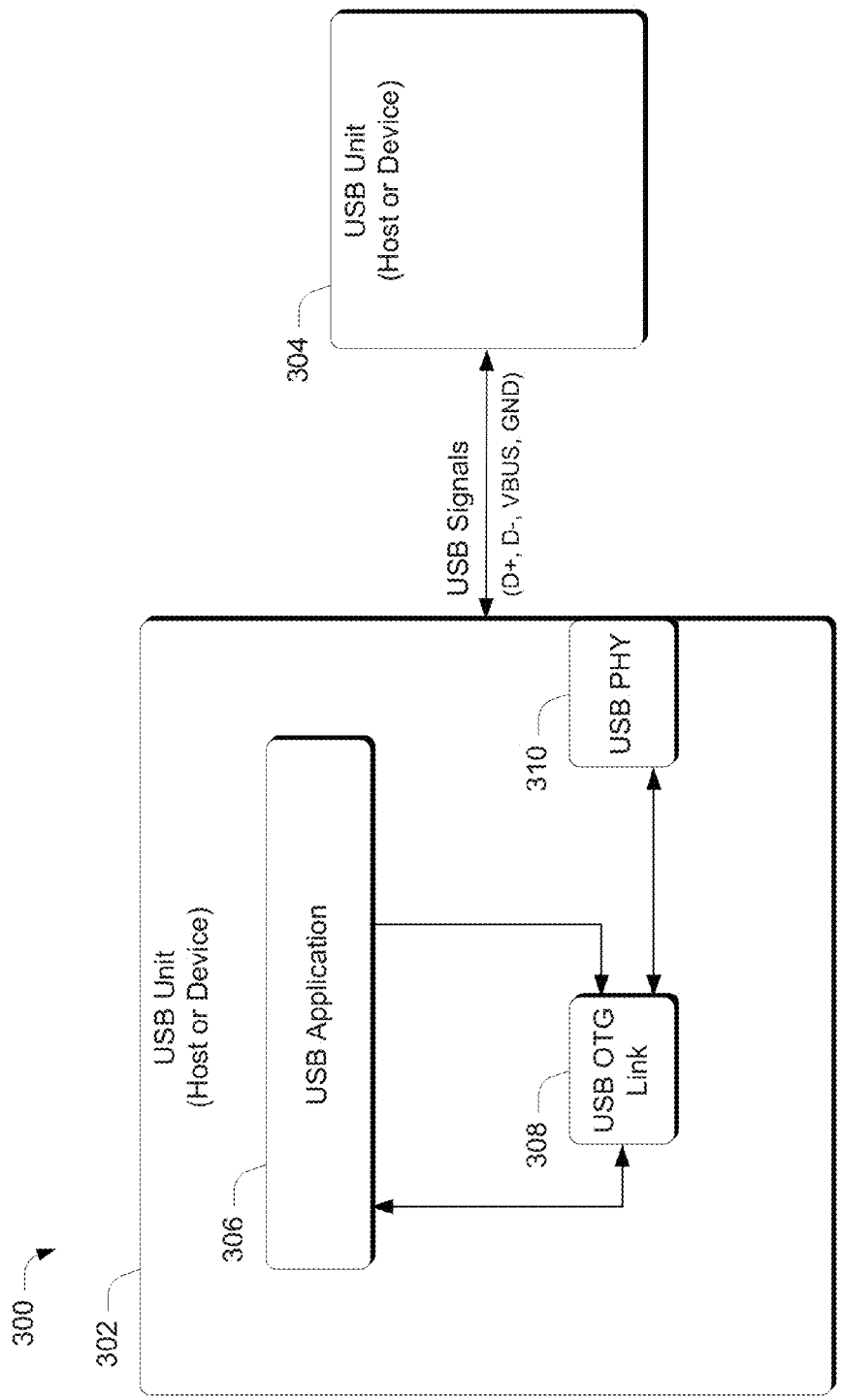
FIG. 3 illustrates an example system in accordance with one or more embodiments.

FIG. 3 illustrates an example system in accordance with one or more embodiments generally at 300. In this example, system 300 includes a USB unit 302 and a USB unit 304. Each of the USB units 302, 304 can be configured as described in relation to USB unit 302.

In the illustrated and described embodiment, USB unit 302 includes a USB application 306, a USB OTG Link 308, and a USB PHY 310. In this example, a mode selection module can include one or more of the application 306 or the USB OTG Link 308. USB application 306 is operably connected or connectable to USB OTG Link 308. In the illustrated example, the connection between USB application 306 and USB OTG Link 308 entering to the right side of the USB OTG Link 308 represents additional signals that the USB OTG link 308 requires to operate with an OTG PHY but which the non-OTG PHY does not have. In this embodiment, those signals are observed and/or controlled by the USB application 306 so that the USB application 306 provides the additional PHY functionality that is not provided by the non-OTG PHY. The USB OTG Link 308 is operably connected or connectable to USB PHY 310. In this example, USB OTG Link 308 is OTG-compliant, meaning that the Link 308 is configured to operate in the Host mode or the Device mode, as well as implement other aspects of OTG functionality. However, USB application 306 is configured to control the USB OTG Link 308 so that it can communicate with a standard, non-OTG USB PHY 310 and use a standard USB cable for the connection between USB units 302, 304. Details of how the control actually occurs can depend on the specifics of the USB OTG Link 308. For instance, a USB OTG Link 308 which includes control registers for switching modes may need the application to perform some register writes to set the USB OTG Link 308 in a different mode. A USB OTG Link 308 with less invasive control capability may require the application to control signals (via the USB application-to-USB OTG Link connection on the right) to emulate portions of the OTG protocol involved in changing modes, e.g., emulating an OTG identification pin to set a particular mode. Other paradigms are possible also.

In the above-described embodiment, communication between the USB OTG Link 308 and the USB PHY 310 takes place using standard USB communication protocols. That is, once a particular mode is selected via the USB OTG Link 308, communication in that particular mode with the USB PHY 310 takes place using standard USB communication protocols. In this case, OTG-specific communication, such as HNP or SRP communication, happens between the USB application 306 or some other component and the USB OTG Link 308.

In this embodiment, and by virtue of using the USB OTG Link 308, less circuitry is required to be employed than in the embodiment described just above. Specifically, because only one Link circuit 308 is used, the additional Link circuitry (208 or 210) utilized in the above-described embodiment can be eliminated. In addition, improvements over standard OTG systems can include the use of a less complex standard USB PHY, rather than a more complex OTG-compliant PHY. Further, standard USB cables and standard USB signals can be utilized while avoiding the additional overhead needed for OTG signaling.

In the illustrated and described embodiment, the USB application 306 can be implemented as any suitable USB application including, by way of example and not limitation, a host software driver, a device software driver, or a driver that functions as both host and device driver.

In at least some embodiments, the USB OTG Link controller 308 and USB PHY 310 can be implemented by an integrated circuitry chip that is pre configurable into a particular mode, e.g., Host mode or Device mode. This permits flexibility in the design of the integrated circuitry chip by enabling either mode to be selected at some point after manufacture of the integrated circuitry chip.

In at least some other embodiments, USB unit 302 can be configured to switchably alternate, in a dynamic fashion, between the Host mode and the Device mode. In these embodiments, USB unit 304 may be compliant with OTG technology if some other unit within USB unit 302, other than USB OTG Link 308 and USB PHY 310, provides the additional functionality required for OTG compliance. Such other unit can include the USB application 306.

Software/Hardware Hybrid Interface

Figure 4:
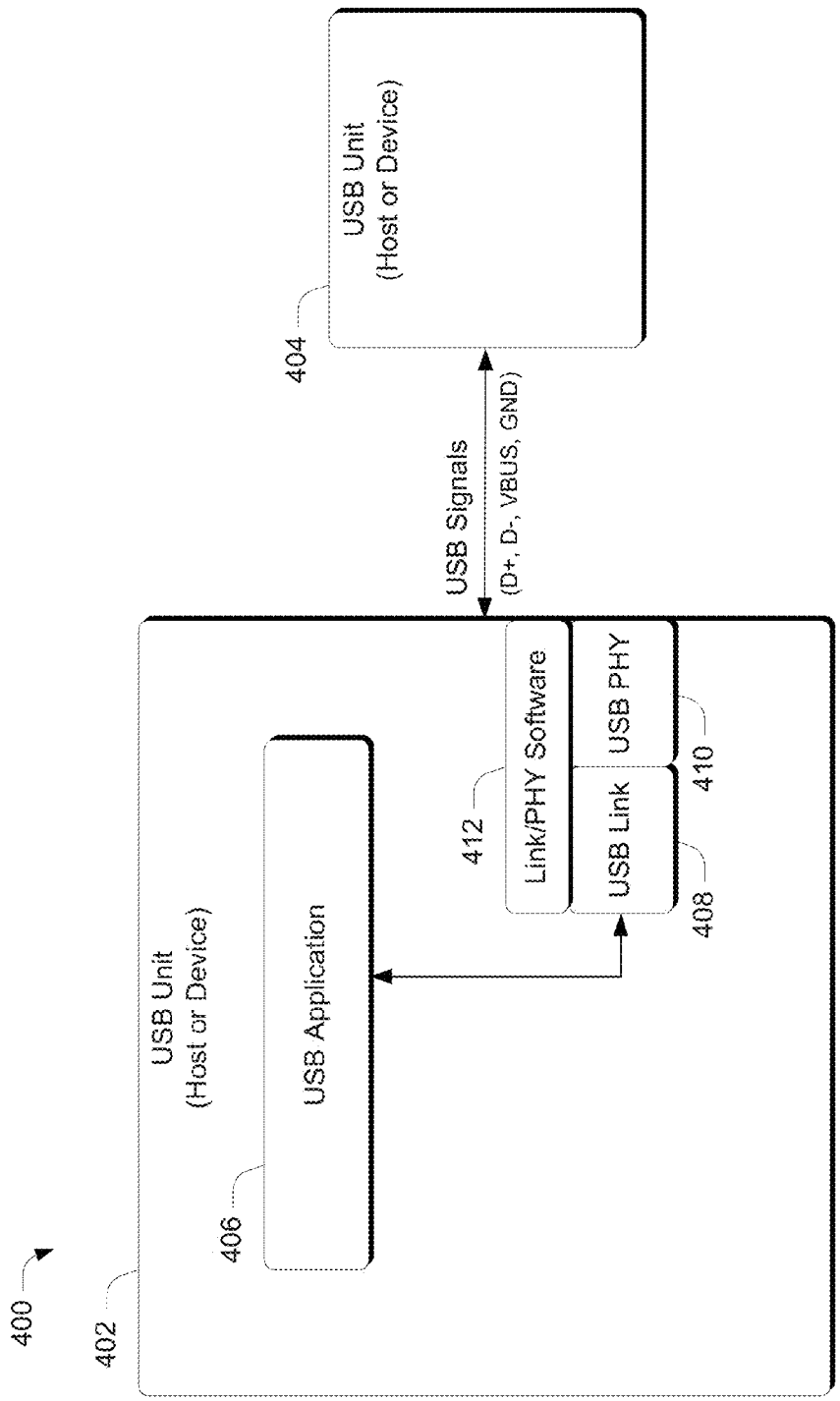
FIG. 4 illustrates an example system in accordance with one or more embodiments.

FIG. 4 illustrates an example system in accordance with one or more embodiments generally at 400. In this example, system 400 includes a USB unit 402 and a USB unit 404. Each of the USB units 402, 404 can be configured as described in relation to USB unit 402.

In the illustrated and described embodiment, USB unit 402 includes a USB application 406, a USB link 408, a USB PHY 410, and Link/PHY software 412 embodied on a tangible computer-readable medium. In this example, a mode selection module can include one or more of the USB application 406, the USB link 408, the USB PHY 410, and the Link/PHY software 412. In at least some embodiments, at least some of the functionality performed by USB link 408 and/or USB PHY 410 can be implemented in software by Link/PHY software 412. For example, portions of the USB link 408 and USB PHY 410 that are different as between the Host and Device modes can be implemented in software and can thus be changed as desired. Specifically, those portions of the USB link 408 and USB PHY 410 that are specific to the Host and/or Device modes can be implemented by Link/PHY software 412. In one example, the USB link 408, USB PHY 410, and Link/PHY software 412 together provide all the control and configuration so that together they provide a USB interface capable of operating in either mode so that collectively, they appear as a true OTG interface to a standard OTG-capable application. The application then operates as if a real OTG link and OTG PHY were present. For example, the Link/PHY software 412 can, in some embodiments, vary the signal levels on the USB D+ and D− wires or activate additional pull-down resistors on the D+ and D− wires when the USB application 406 activates the Host mode on the application-link interface. Alternately or additionally, the Link/PHY software 412 can, in some embodiments, activate additional, non-standard functionality in the USB Link 408 or USB PHY 410 that is utilized to switch modes.

In another example, USB application 406 can be either Host- or Device-capable, but not OTG capable. Alternately or additionally, there may be two independent USB applications, one of which is a pure Host application and the other of which is a pure Device application. Either one of these applications can run depending on the particular mode. In either case, the Link/PHY software 412, USB Link 408, and USB PHY 410 act either purely as a Host or Device, depending on the mode.

In at least some embodiments, the Link/PHY software 412 can handle transaction-level protocol. For example, a USB Out transaction is comprised of, in general, an Out token (from Host to Device), a data packet (from Host to Device), and a handshake (from Device to Host). This transaction is used to send data from a Host to a Device. A USB In transaction is comprised of, in general, an In token (from Host to Device), a data packet (from Device to Host), and a handshake (from Host to Device). This transaction is used to send data from a Device to a Host. When operating in Host mode, the Link/PHY software 412 initiates the Out token including maintaining knowledge of a target device's address, target endpoint number, communications capabilities and the like. The Link/PHY software 412 then initiates building and transmitting a data packet, waits for a handshake, and processes associated results accordingly. However, when operating in Device mode, the Link/PHY software 412 detects an incoming In token, then initiates the building and transmitting of a data packet, waits for a handshake, and processes those results accordingly. In both cases, the process of sending data is similar and is composed of similar smaller operations. However, the overall flow is somewhat different. Specifically, the Host decides what actions to take and then initiates those actions, while the Device waits for a request from the Host and then acts on the request. In these instances, the Device can transmit ACK, NAK, and NYET handshakes, while the Host only sends an ACK. In this embodiment, all of these differences are implemented by the Link/PHY software 412. Common features such as building and transmitting packets are implemented in hardware, while the high-level protocol control is implemented in software.

Using Link/PHY software 412 as described above can simplify the design of the USB link 408 and/or the USB PHY 410. Specifically, in at least some embodiments, the design of the USB link 408 and/or the USB PHY 410 can be modified to include those components that are common to the Host and Device modes. Such components can include, by way of example and not limitation, a phase-locked loop (PLL), a serializer/deserializer (SERDES), data encoding and decoding circuits, data buffers, current source circuits, voltage reference circuits, and the like. Further, in at least some embodiments many of the protocol components can be implemented in hardware as well. These protocol components include, by way of example and not limitation, NRZI encoding components, bit stuffing components, CRC generation and checking components, packet formation and stripping components, address/endpoint management components, status generation and tracking components, and the like.

Example Methods

FIG. 5 is a flow diagram that describes acts in a method in accordance with one or more embodiments. The method can be implemented in connection with any suitable hardware, software, firmware, or combination thereof. In at least some embodiments, the method can be implemented by a suitably-configured USB unit such as those described above in FIGS. 2 and/or 3.

At 500, determine whether a USB unit is to operate in a Host or a Device mode. This can be performed in any suitable way. For example, a USB unit might select Host or Device mode based on a choice by the user, e.g. a button press. Alternately or additionally, the USB unit can passively monitor the signaling which another USB unit presents on VBUS, D+, and D– after the USB cable is connected, determine if the other USB unit is acting as a Host or Device, and then choose the alternate mode to allow for communication (e.g., choose Host mode if the other unit is acting in the Device mode and vice versa). Alternately or additionally, the USB unit can actively drive Host signaling onto the USB interface after connection, determine if the other USB unit responds, and if not then select the other mode. Alternately or additionally, mode selection can also be based on the USB connection. For example, OTG utilizes an ID pin in the connector to tell whether the unit is connected as a Host or Device. External hardware, such as a controller, can read the state of a pin, where the pin could be tied high to select one mode and tied low to select the other mode. Mode selection can also be implemented using internal hardware such as an internal ROM or fuse bit, or through embedded software that uses a value programmed into boot ROM.

At 502, select one of the Host or Device modes. This can be performed in any suitable way, examples of which are provided just above. For example, a particular mode can be selected under the influence of a USB application executing on the USB unit. In the FIG. 2 example above, the USB application 206 interfaces with a switch 212 effective to select a particular USB Host link 208 or USB Device link 210. Alternately or additionally, a particular mode can be selected through a USB application's interaction with a USB OTG Link, such as the one shown in FIG. 3 at 308. Recall that in the FIG. 3 example, the USB OTG Link 308 is OTG-compliant, meaning that it can operate in either the Host or Device modes. Accordingly, the USB application 306 can interface with the USB OTG Link 308 effective to select a particular mode.

At 504, having selected a particular mode, operate the USB unit in a selected mode using a non-OTG PHY.

FIG. 6 is a flow diagram that describes acts in a method in accordance with one or more embodiments. The method can be implemented in connection with any suitable hardware, software, firmware, or combination thereof. In at least some embodiments, the method can be implemented by a suitably-configured USB unit such as the one described above in FIG. 4.

At 600, determine whether a USB unit is to operate in a Host or a Device mode. This can be performed in any suitable way, examples of which are provided above.

At 602, select one of the Host or Device modes. This can be performed in any suitable way. For example, a particular mode can be selected under the influence of a USB application executing on the USB unit.

At 604, operate the USB unit in a selected mode using one or more of a non-OTG modified link or a non-OTG modified PHY. In the example of FIG. 4, the USB Link 408 and/or the USB PHY 410 can be modified by virtue of having functionality that is different as between Host and Device modes implemented by Link/PHY Software 412.

Having considered some example methods, consider now a discussion of some example USB units.

Example USB Units

FIGS. 7-10 illustrate some example devices that can serve as USB units in accordance with one or more embodiments. The illustrated and described devices can be configured in accordance with any of the embodiments described above.

Figure 7:
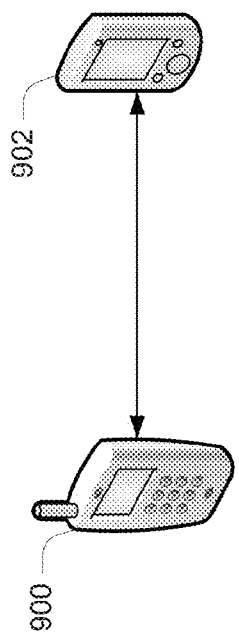
FIG. 7 illustrates example devices that can serve as USB units in accordance with one or more embodiments.
Figure 8:
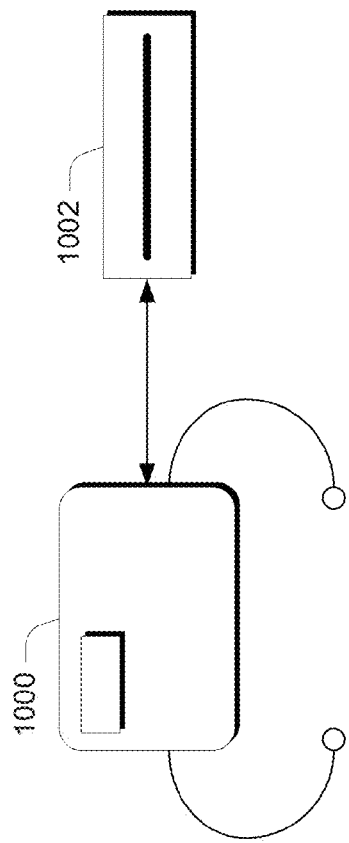
FIG. 8 illustrates example devices that can serve as USB units in accordance with one or more embodiments.
Figure 9:
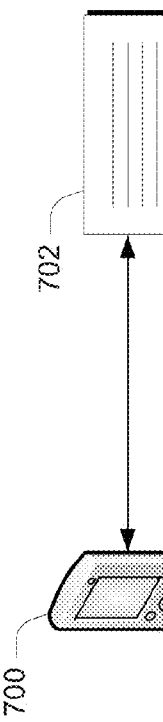
FIG. 9 illustrates example devices that can serve as USB units in accordance with one or more embodiments.
Figure 10:
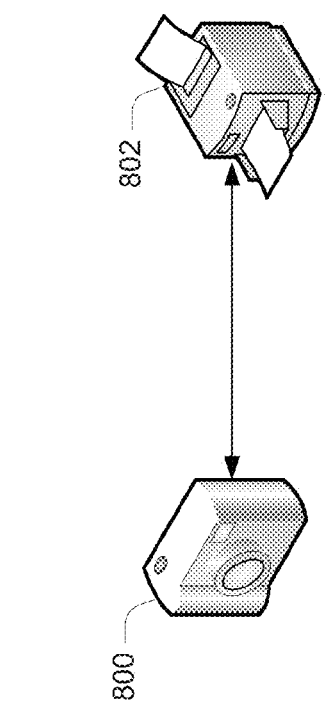
FIG. 10 illustrates example devices that can serve as USB units in accordance with one or more embodiments.

FIG. 7 illustrates a personal digital assistant 700 connected to a keyboard 702. FIG. 8 illustrates a camera 800 connected to a printer 802. FIG. 9 illustrates a phone 900 connected to a personal digital assistant 902. FIG. 10 illustrates an MP3 player 1000 connected to a hard disk 1002.

It is to be appreciated and understood that the example devices illustrated in FIGS. 7-10 are but examples only. Accordingly, other devices can serve as USB units without departing from the spirit and scope of the claimed subject matter.

CONCLUSION

Various embodiments described above provide a USB interface that can operate in either a Host or Device mode using standard Link and/or physical interface circuit (PHY) components which, in at least some embodiments, do not have additional circuitry that is utilized to implement the USB OTG standard. The various embodiments described above can permit, in at least some instances, less expensive and more reliable standard non-OTG components to be utilized. This can mitigate concerns associated with particular OTG components which, as of this time, are relatively new and not as widely available as the non-OTG components. Further, some applications may require Host or Device capability, but may not need additional OTG features such as on-the-fly role switching. In these instances, the various embodiments can enable such applications to operate without extraneous hardware and/or software overhead.

In addition, OTG requires measurement and control of different voltages than are required for use by standard USB. Typically, this means that the PHY requires an additional supply voltage and additional analog drive and sensing circuitry. Further, OTG may require more complex protection from over-voltage and transients as well. In at least some embodiments described above, additional voltage supplies, protections, and other circuitry beyond that used in standard USB is not required.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
    a USB On-The-Go (OTG) Link controller having two modes of operation, the modes of operation including a Host mode and a Device mode, the USB OTG Link controller configured to:
        operate in the Host mode to support the system being connected to a USB device; or
        operate in the Device mode to support the system being connected to a USB host;
    a non-OTG USB physical interface circuit (PHY) connected to the USB OTG Link controller, the non-OTG USB PHY including circuitry for communication via a USB bus; and
    hardware computer-readable storage media comprising software of an interface component that, when executed, implements the Host mode or the Device mode.

2. The system of claim 1, further comprising a USB application configured to control the USB OTG Link controller effective to select the Host mode or the Device mode.

3. The system of claim 1, wherein USB data communication between the OTG Link controller and the non-OTG USB PHY does not pass through a multiplexer.

4. The system of claim 1, wherein USB data is communicated indirectly between the non-OTG PHY and the OTG Link controller.

5. The system of claim 1, wherein USB data is communicated directly between the non-OTG PHY and the OTG Link controller.

6. One or more hardware computer readable storage media encoded with computer-executable instructions that, responsive to execution, directs a computing device to perform acts, the acts comprising:
    determining whether a Universal Serial Bus (USB) unit is to operate in a Host or a Device mode;
    selecting one of the Host or the Device modes; and
    operating, via a software interface component of the USB unit, the USB unit in a selected mode using a non-On-The-Go (OTG) physical interface circuit (PHY) connected to an OTG Link controller, the non-OTG PHY including analog drive circuitry and sensing circuitry for communication via a USB bus, the software interface component embodied on the hardware computer-readable storage media of the USB unit.

7. One or more hardware computer readable storage media of claim 6, wherein the selecting is performed under the influence of a USB application.

8. One or more hardware computer readable storage media of claim 6, wherein USB data is communicated indirectly between the non-OTG PHY and the OTG Link controller.

9. One or more hardware computer readable storage media of claim 6, wherein USB data is communicated directly between the non-OTG PHY and the OTG Link controller.

10. One or more hardware computer readable storage media of claim 6, wherein USB data communicated between the non-OTG PHY and the OTG Link controller is not communicated via a multiplexer or switch.

11. One or more hardware computer readable storage media of claim 6, wherein USB data communicated between the non-OTG PHY and the OTG Link controller is communicated via a multiplexer or switch.

12. One or more hardware computer readable storage media of claim 6, wherein the operating is performed using, at least in part, Link/PHY software that is configured to implement functions that are specific to the Host mode and the Device mode.

13. One or more hardware computer readable storage media of claim 6, wherein the OTG Link controller is a partial OTG Link controller configured to implement Link controller functionalities common to the Host mode and the Device mode.

14. A Universal Serial Bus (USB) unit comprising:
    a partial non-On-The-Go (OTG) Link controller configured to implement Link controller functionalities common to a Host mode and a Device mode of operation;
    a partial non-OTG physical interface circuit (PHY) connected to the partial OTG Link controller and configured to implement PHY functionalities common to the Host mode and the Device mode of operation, the partial non-OTG PHY including analog drive circuitry and sensing circuitry for communication via a USB bus; and
    hardware computer-readable storage media comprising Link/PHY software that, when executed, implements Link/PHY functionalities that are specific to the Host mode or the Device mode of operation.

15. The USB unit of claim 14, further comprising a mode selection module configured to determine whether the USB unit is to operate in the Host mode or the Device mode of operation and to execute the Link/PHY software to operate the partial OTG Link controller and the partial non-OTG PHY in the selected Host mode or the selected Device mode of operation.

16. The USB unit of claim 14, wherein when executed, the Link/PHY software further implements functionalities associated with transaction level protocols for the Host mode or the Device mode of operation.

17. The USB unit of claim 16, wherein the functionalities associated with transaction level protocols for the Host mode comprise functionalities for initiating an Out token to a USB Device, communicating data with the USB Device, and performing a handshake with the USB Device.

18. The USB unit of claim 14, wherein USB data is communicated directly or indirectly between the partial non-On-The-Go (OTG) Link controller and the partial non-OTG PHY.

19. The USB unit of claim 18, wherein the USB data is not communicated through a multiplexer or a switch.

20. The USB unit of claim 18, wherein the USB data is communicated through a multiplexer or a switch.

* * * * *